June 10, 1958  C. W. CHAPMAN  2,837,901
FLEXIBLE COUPLINGS
Filed Jan. 21, 1953  7 Sheets-Sheet 1
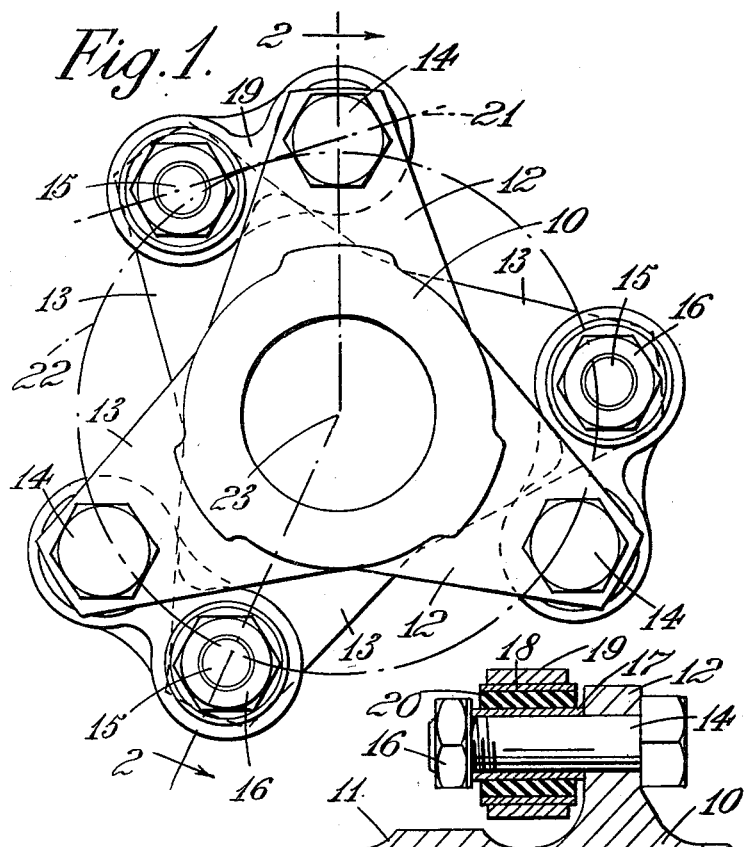
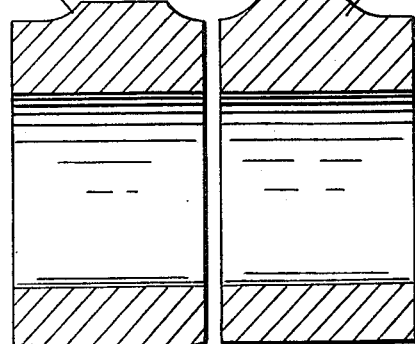
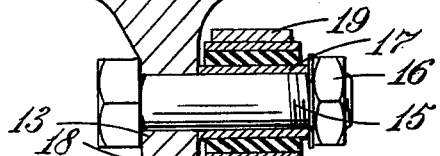
Inventor
Charles Wallace Chapman June 10, 1958   C. W. CHAPMAN   2,837,901
FLEXIBLE COUPLINGS
Filed Jan. 21, 1953   7 Sheets-Sheet 2

Inventor
Charles Wallace Chapman
his Attorneys

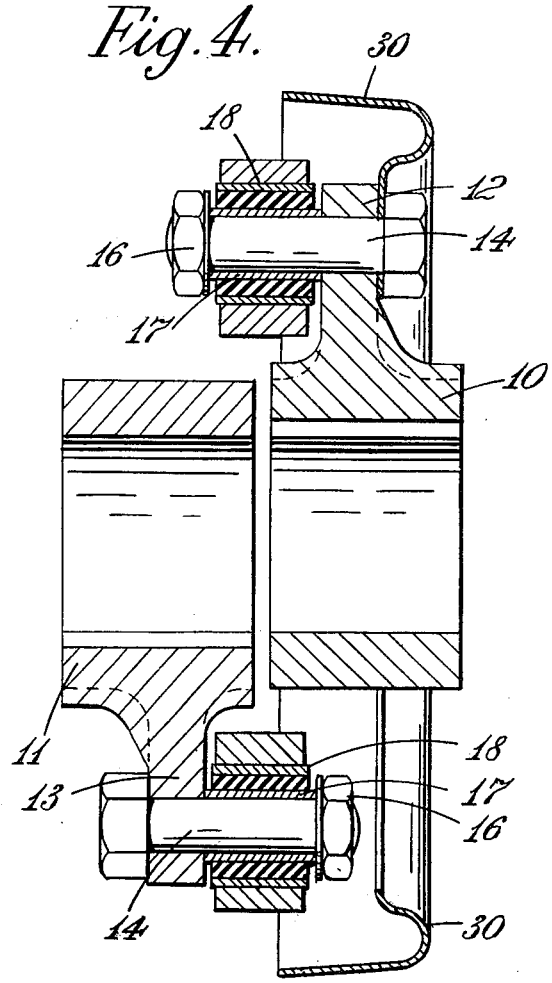

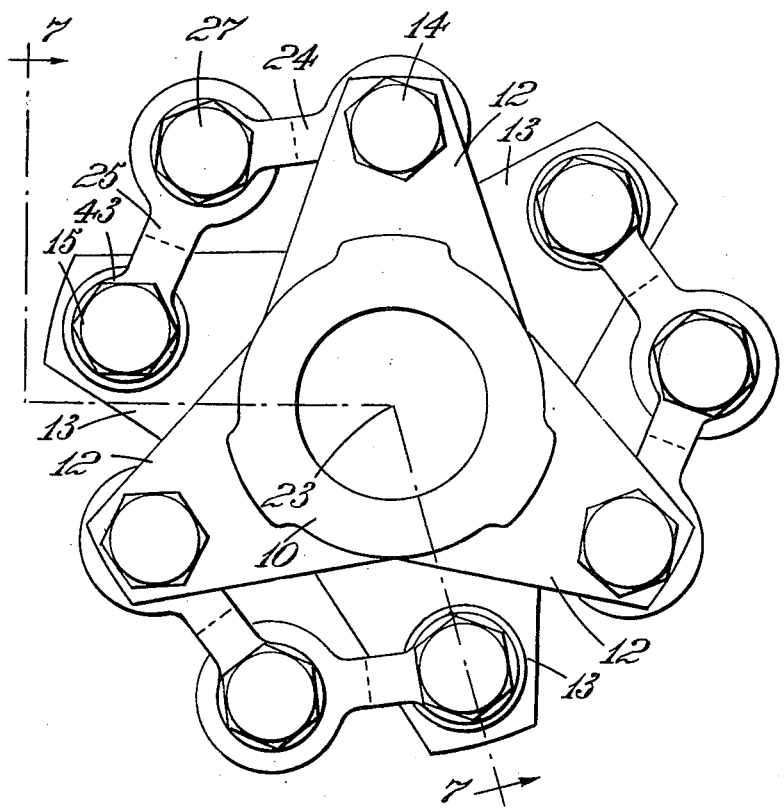

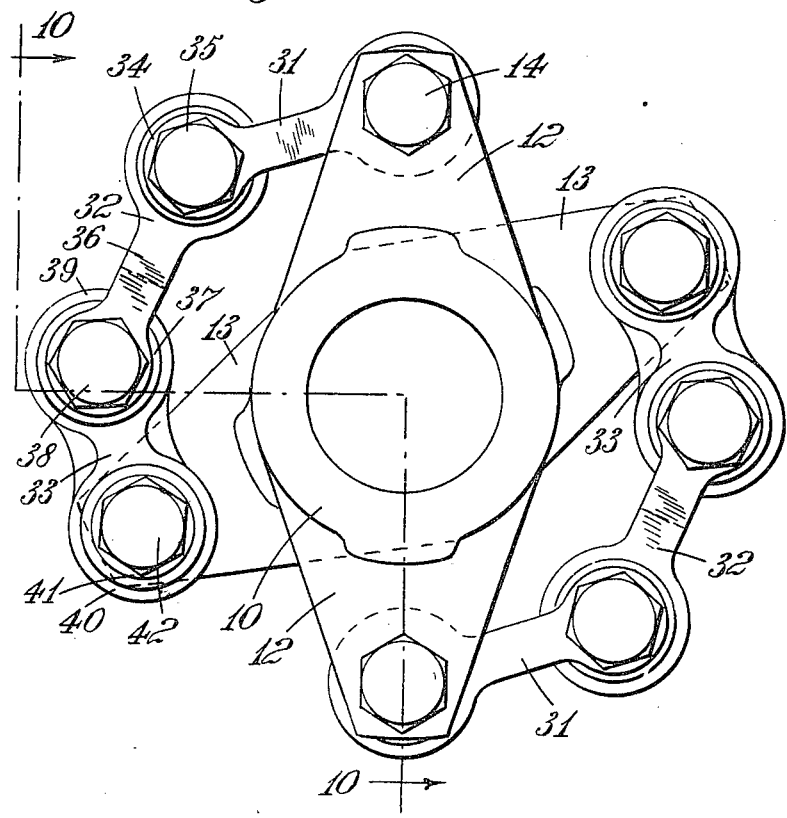

June 10, 1958  C. W. CHAPMAN  2,837,901
FLEXIBLE COUPLINGS
Filed Jan. 21, 1953  7 Sheets-Sheet 6
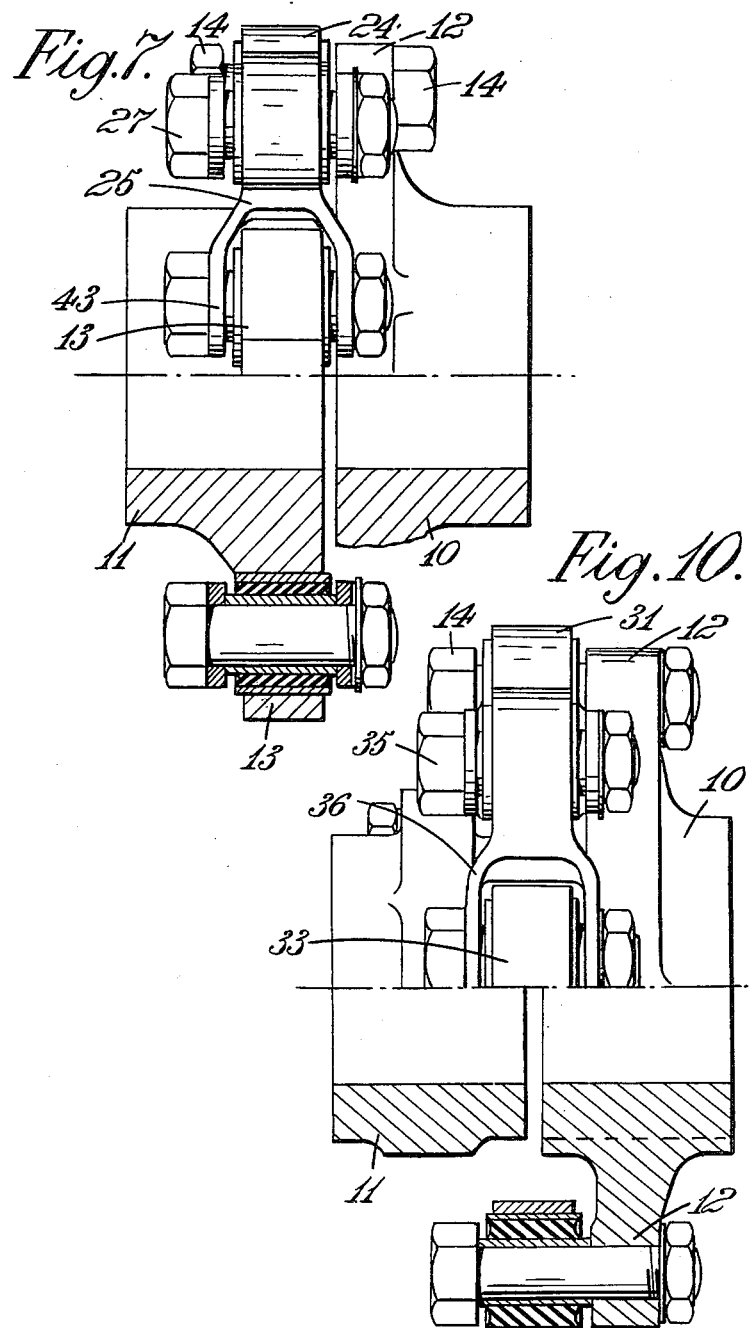

June 10, 1958

C. W. CHAPMAN 2,837,901

FLEXIBLE COUPLINGS

Filed Jan. 21, 1953

Inventor
Charles Wallace Chapman

United States Patent Office 2,837,901
Patented June 10, 1958

2,837,901

FLEXIBLE COUPLINGS

Charles Wallace Chapman, Burstow, near Horley, England, assignor to Compression Ignition Limited, Twickenham, England, a British company Application January 21, 1953, Serial No. 332,280

Claims priority, application Great Britain January 25, 1952

1 Claim. (Cl. 64—12)

This invention relates to flexible couplings for transmitting a drive between rotatable elements and of the kind in which the rotatable elements or parts secured thereto are connected together by a number of "linkages," the links of which are mounted on pivot pins to pivot about axes substantially parallel with the axes of rotation of the rotatable elements when the latter axes are in line which pivot pins are connected to the links and to the rotatable elements by resilient bushes in such manner as to permit a degree of mal-alignment of the axes of rotation of the rotatable elements and so as to provide a degree of torsional resilience between those elements.

According to this invention a flexible coupling for connecting two rotatable elements comprises a similar number of axially extending pins fixed to and spaced evenly around a circle on each rotatable element, a linkage connecting each pin on one rotatable element to a pin on the other element, each joint of the linkage embodying a resilient bush comprising inner and outer cylindrical metal sleeves between which is bonded a rubber or rubber-like bush, the inner metal sleeve being clamped to a pin constituting one part of the joint and the outer sleeve being a force fit in a socket formed in the other part of the joint which linkages are so dimensioned and arranged that when no torque is being transmitted the axes of adjacent pins of a linkage lie closely adjacent circles struck about the axis of rotation of the coupling and to which lines joining the axes of the adjacent pins are tangent.

In one simple form of the invention each of a number of lugs on one rotatable element is connected to one of a similar number of lugs on the other rotatable element by a single link, which link is formed at each end with a bore in which is tightly wedged the outer sleeve of a resilient bush the inner sleeve being tightly clamped against a lug on one of the rotatable members by a clamping bolt or pivot pin which passes through the inner sleeve, the pins or bolts being so located in said lugs that a line joining their axes is tangential to a circle as hereinbefore defined.

With this arrangement the drive is transmitted from one rotatable element to the other by tension or compression in the links. The drive is cushioned by the resilience of the bushes and a limited angular or axial mal-alignment of the axes of rotation of the rotatable elements is compensated by the distortion of the resilient bushes whilst moderate radial mal-alignment is compensated partly by limited swinging of the links, the resilient bushes allowing for this movement and partly by compressive or tensile distortion of the resilient bushes. It will be appreciated that in compensating for mal-alignment there is no metal or metal contact or rubbing and the loads imposed by mal-alignment are much less than in the more conventional pin and link couplings in which metal or metal contact at the pivot joints takes place.

Where greater resilience is required, each lug on one rotatable element may be connected to a lug on the other rotatable element by a number of links or sets of links pivoted end to end by resilient bushes and pivot pins. In such an arrangement there may be employed links each forked at one end so as to straddle the ends of another link or to straddle a lug on one of the rotatable elements to which it is pivotally attached by said resilient bush and associated pivot pin.

For example a forked link may have its non-forked end connected to a lug on the rotatable element by a pivot pin and resilient bush while its forked end is arranged to straddle one end of a straight link to which it is connected by a resilient bush and another pivot pin while the other end of said link is connected by a further resilient bush and pivot pin to a lug on the other rotatable element. In such an arrangement the first said pivot pin may be arranged to clamp the inner sleeve of the resilient bush between a head on the pin and the aforesaid lug on the rotatable element while the outer sleeve of that bush is firmly engaged with a bore in the non-forked end of the links and the second pivot pin is arranged to clamp the limbs of the fork firmly against the ends of the inner sleeve of the second resilient bush the outer sleeve being firmly wedged in a bore of the straight link while the third pivot pin is arranged to clamp the inner sleeve of the third resilient bush against the lug on the other rotatable element while the outer sleeve is firmly wedged in a bore at the other end of the straight link.

The pivot pins for use in such an arrangement comprise clamping bolts.

It will be appreciated that, where still greater torsional resilience is required and/or still greater mal-alignment requires to be compensated, more than two links or sets of links may be arranged to connect the two lugs on the rotatable element in which case two adjacent links may be of the forked type, the forked limbs of one link engaging the non-forked end of the other link.

It is also possible that by appropriately disposing the lugs on the two rotatable elements to employ only forked links, the non-forked end of one link may be pivotally connected to a lug on one of the rotatable elements by a pivot pin and resilient bush, while the forked end of that link may engage the non-forked end of the adjacent link, the forked end of that adjacent link may straddle the lug on the other rotatable element or the non-forked end of another link and so on.

The following is a description of a number of flexible couplings according to the invention reference being made to the accompanying drawings in which:

Figure 1 is an end elevation of a simple form of coupling in which each linkage comprises a single link;

Figure 2 is a section on the bent line 2—2 of Figure 1;

Figure 4 is a section on the bent line 4—4 of Figure 3;

Figure 6 is a similar view to Figure 3 of an arrangement in which each linkage comprises two links end to end the end of one link being forked to engage a lug on one of the elements of the coupling whereas the other end of the linkage engages a pivot bolt extending through and to one side of a lug on the other element.

Figure 7 is a section on the bent line 7—7 of Figure 6;

Figure 8 is a similar view to Figure 6 but an arrangement in which each linkage comprises a series of three links and showing the position of the links when no torque is being transmitted.

Figure 10 is a section on the bent line 10—10 of Figure 8.

Figure 3:
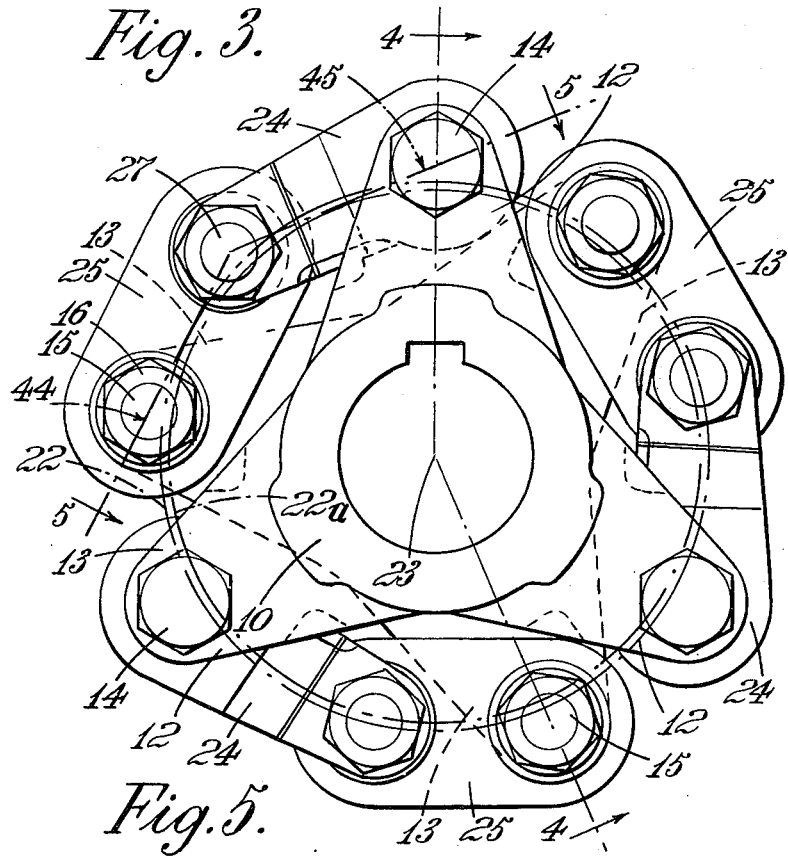
Figure 3 is a similar view to Figure 1 showing a coupling in which each linkage comprises two links end to end and wherein the linkages are disposed to one side of the lugs on the coupling elements.

Referring to the constructions shown in Figures 1 and 2 the two rotatable elements of the coupling comprise hub portions 10 and 11 the former being provided with three radially extending lugs 12 and the latter with three radially extendings lugs 13. The lugs 12 carry pivot bolts 14 and the lugs 13 carry pivot bolts 15. The pivot bolts are provided with clamping nuts 16 and encircling each pivot bolt is the inner metal sleeve 17 of a resilient bush, the outer sleeve 18 of the bush being a force fit in one end of a link 19 and rubber 20 prestressed in a radial direction being bonded between the inner and outer sleeves 17 and 18. Each link 19 is thus arranged to connect together a pivot bolt 14 in a lug 12 on one element of the coupling with a pivot bolt 15 in a lug 13 on the other element of the coupling. The length of the links 19 and the length of the lugs 12 and 13 are so selected that the axes of the pivot bolts 14 and 15 lie closely adjacent to a circle 22 struck about the axis 23 of the two rotatable elements of the coupling when these are in line, to which circle a line 21 joining the axes 14 and 15 is tangent. Preferably the radial distance of the axis of each bolt from the circle is not more than 20% of the radius of the circle. As will be seen from Figure 2 the links are disposed to one side of the lugs 12 and 13.

Figure 5:
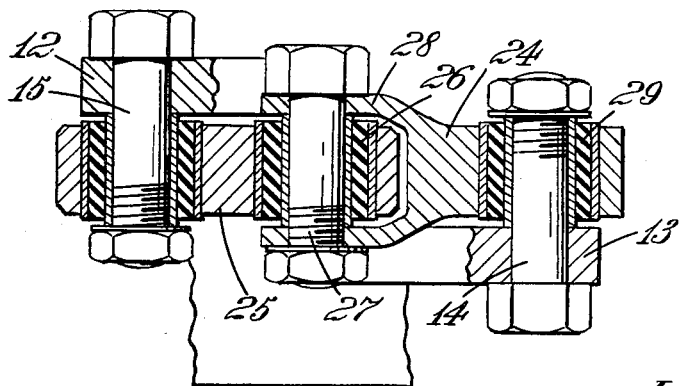
Figure 5 is a section on the line 5—5 of Figure 3.

In the construction shown in Figures 3, 4 and 5 instead of each pair of lugs 12 and 13 being connected together by a single link, each lug 12 on one coupling element 10 is connected to the lug 13 on the other coupling element 11 by two links 24 and 25 arranged end to end. Thus it will be seen from Figure 5 that the pivot bolt 15 extending to one side of the lug 12 has connected to it, through the resilient bush, a link 25. A resilient bush 26 at the other end accommodates a pivot bolt 27 which passes through the fork arm 28 of the link 24. The other end of the link 24 carries a resilient bush 29 through which the pivot bolt 14 passes and secures it to the lug 13. The arrangement is such that the axes of the bolts 15, 27, 14 lie closely adjacent the circles 22 and 22A to which are tangent the lines 44, 45 joining the axes of the bolts 15, 27 and the bolts 27, 14 respectively. Again in this instance it will be noted that the linkages are disposed to one side of the lugs 12 and 13. A closure member 30 may be secured to each set of lugs 12 and 13 the closure member secured to the lugs 12 only being shown.

The arrangement shown in Figures 6 and 7 is very similar to that described with reference to Figures 3 to 5 with the exception that instead of the links 25 being straight links one end of each is forked at 43 and straddles the lug 13. The shapes of the links 24 and 25 also differ in that they are waisted at their centres.

Figure 9:
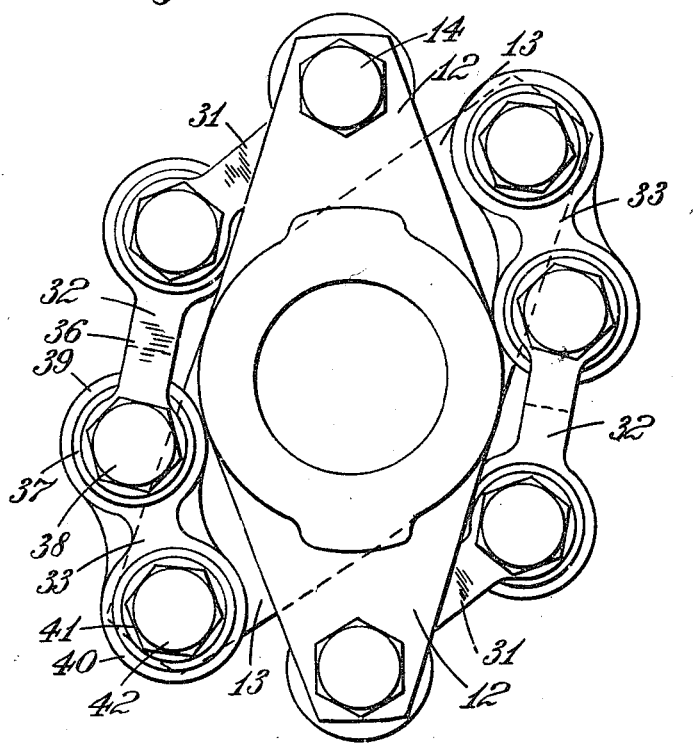
Figure 9 is a similar view to Figure 8 showing the position of the links when a substantial torque is being transmitted.

In the construction shown in Figures 8, 9 and 10 the rotatable elements 10 and 11 are only provided with two lugs 12 and 13 respectively, and each lug 12 on one element is connected to a lug 13 on the other element by three links 31, 32 and 33. The link 31 is plain at one end and is connected by the pivot bolt 14 to one side of the lug 12. The pivot bolt passes through a resilient bush as in the previous construction. The other end of the link 31 is forked and straddles the inner end of the sleeve of a resilient bush 34 to which it is clamped by the bolt 35. The outer sleeve of the resilient bush is press fit in the plain end of the link 32 the other end of which link is forked at 36 and straddles the inner sleeve of a resilient bush 37 to which it is clamped by the pivot bolt 38. The outer sleeve of the bush 37 is press fit in one end 39 of the link 33 the other end 40 of which link encircles a resilient bush 41, the inner sleeve of which is clamped by the pivot bolt 42 to the lug 13, this latter link 33 being plain ended, thus there are provided two fork ended links 31, 32 and a plain ended link 33 in each linkage. It will be seen from Figure 9 that when a substantial torque is transmitted the links 31, 32 tend to flatten out.

In assembling a coupling in which two links are connected end to end between lugs on the two rotatable elements the bushes are clamped in such a position on the pins and links that the angle between a line joining the axes of the pins in said lugs and a second line joining one of those pivot axes with the axis of a pivot pin connecting the two links is substantially equal to the angle between the first said line and a third line joining the axis of the pivot pin in the other lug with the axis of the intermediate pivot pin while the angle between the second and third lines is the sum of the aforesaid angles. The distance between the axes of the two resilient bushes and pivot pins associated with each link may be so selected in relation to the distance between the lugs which are connected by the links that the required degree of mal-alignment may be compensated and the torsional stiffness varied. With a coupling embodying two links pivoted end to end between lugs on the rotatable elements, when torque is transmitted from one element to the other, so that the links are in tension, the links tend to straighten out with increasing load thus reducing the angles referred to above so that the coupling will have appreciable torsional resilience its stiffness increasing with the increase of torque.

Greater axial and angular mal-alignment can be compensated than in the simpler type of coupling having a single link between the two rotatable elements while very appreciable radial mal-alignment can be compensated, as under excessive radial mal-alignment the articulated linkages can buckle. The torsional stiffness of the coupling of any given number of links can be varied by varying the initial values of the aforesaid angles and or by varying the torsional stiffness of the resilient bushes while should still greater torsional resilience or compensation for mal-alignment be required each linkage may as set out above comprise three or more links connected end to end, the opposite ends of each link system being secured respectively to one of the rotatable elements and the other end of the linkage to the other rotatable elements.

I claim:

A flexible coupling, for connecting together two substantially co-axial rotatable elements, comprising a number of axially extending pins fixed to and spaced around a circle on each rotatable element, a number of independent linkages each made up of a number of links pivoted end to end by pivotal connections so that the links on each linkage extend away from one another and connect a pin on one element to a pin on the other element and with the intermediate pivotal connections of the various linkages free to move radially independently of one another and so that when no torque is being transmitted, the axes of all the pivotal connections lie closely adjacent one and the same circle and a torsionally resilient bush in each joint comprising inner and outer sleeves fixed respectively to a pin and to one of the elements and rubber bonded between the sleeves which bush is arranged to restrain pivotal movement of the connections.

References Cited in the file of this patent

UNITED STATES PATENTS

| | | |
|---|---|---|
| 1,894,507 | Ainsworth | Jan. 17, 1933 |
| 2,055,951 | Strandgren | Sept. 29, 1936 |
| 2,396,353 | Venditty | Mar. 12, 1946 |
| 2,540,703 | Wellauer | Feb. 6, 1951 |

FOREIGN PATENTS

| | | |
|---|---|---|
| 408,432 | Italy | Dec. 29, 1944 |
| 917,097 | France | 1946 |
| 651,890 | Great Britain | 1951 |